J. Lefeber,
Hollow Auger.
Nº 58,436. Patented Oct. 2, 1866.
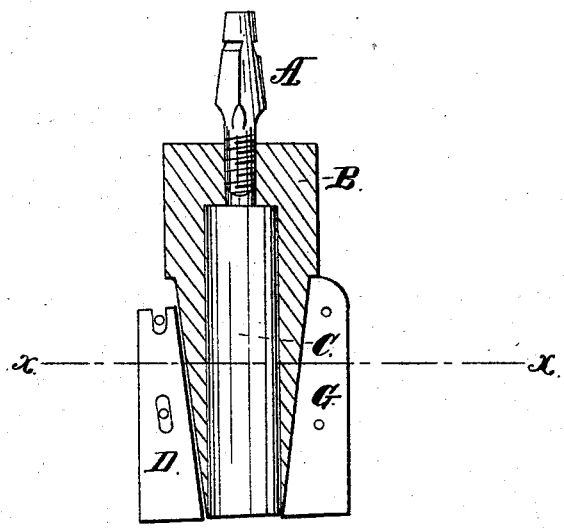
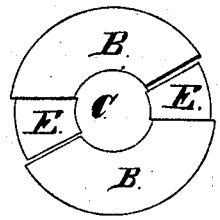
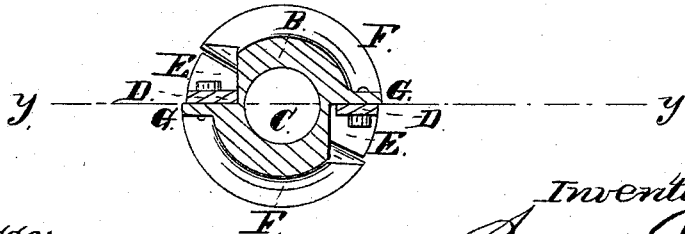
Witnesses.
Inventor:
James Lefeber
Per Munn & Co
Attys.

UNITED STATES PATENT OFFICE.

JAMES LEFEBER, OF CAMBRIDGE CITY, INDIANA.

IMPROVEMENT IN HOLLOW AUGERS.

Specification forming part of Letters Patent No. 58,436, dated October 2, 1866; antedated August 23, 1866.

*To all whom it may concern:*

Be it known that I, JAMES LEFEBER, of Cambridge City, Wayne county, and State of Indiana, have invented a new and useful Improvement in Hollow Augers; and I do hereby declare that the following is a full, clear, and exact description thereof, which will enable others skilled in the art to make and use the same, reference being had to the accompanying drawings, forming part of this specification, in which—

Figure 1 is an axial section, in the line $y$ of Fig. 3, of a hollow auger made according to my invention. Fig. 2 is a bottom or face view. Fig. 3 is a cross-section on the line $x$ of Fig. 1.

Similar letters of reference indicate like parts.

In this construction of a hollow auger simplicity, strength, durability, and cheapness have been sought after. The extreme diameter of the auger is found on its bottom or face, whence it rapidly decreases, and its body is carried up of a small diameter. Wings are formed on the opposite sides of the body to receive the shanks of the cutters, which shanks are adjustably secured to them. The cutters are at right angles to their shanks and project through openings in the bottom or face of the auger.

A designates the square-notched tang, by which the auger may be held in a brace. B is a cylindrical stock, which is of less diameter than the bottom F of the auger, and has the radial wings G extending therefrom at points opposite to each other, to which wings the shanks D of the cutters or bits E are fixed, adjustably, by means of screws, which hold the shanks firmly against said wings, passing through oblong slots in said shanks, so that the bits can be raised or lowered to cut more or less chip, as desired by the operator.

In the axial section, Fig. 1, the shank D of one of the cutters is seen on the left-hand side, and one of the wings G is seen on the right-hand side.

The bits E are at right angles with their shanks and occupy openings in the bottom F of the auger, which are enough wider than the bits to allow the chips made by their cutting-edges to pass upward around body B. The shanks D, moreover, are wider at bottom, where they join the bits, than they are at top, so as to give increased strength at the place where it is most required, and the body of the auger is cut down alongside of the wings G to make room and allowance for this shape in the shanks.

The letter C designates the hollow space in the auger to receive the tenon which is formed by it.

What I claim as new, and desire to secure by Letters Patent, is—

A hollow auger, substantially as above described, with radial wings on the exterior of its body, and with bits or cutters fastened adjustably to such wings, as above shown.

JAMES LEFEBER.

Witnesses:
ELY S. SPRIGGS,
SAMUEL WIDOVER.